May 17, 1966 G. TAKENAKA 3,252,142

CODE RECEIVER RESPONSIVE TO PLURAL BINARY SUB-GROUP

Filed Sept. 10, 1962

INVENTOR
GEORGE TAKENAKA

BY Gene W. Arant

ATTORNEY

United States Patent Office 3,252,142

Patented May 17, 1966

3,252,142

CODE RECEIVER RESPONSIVE TO PLURAL BINARY SUB-GROUP

George Takenaka, Santa Ana, Calif., assignor to Codamite Corporation, a corporation of California Filed Sept. 10, 1962, Ser. No. 222,711
8 Claims. (Cl. 340—164)

The present invention relates to a selective digital signaling system, and more particularly to digital decoding apparatus adapted to respond to only one predetermined value of a digital code sequence of predetermined length.

In the prior art there have been many types of apparatus devised for the purpose of responding to a single predetermined value of a calling code. Included among these, for example, are the cathode ray tube arrangement shown in U.S. Patent No. 2,589,130 issued March 11, 1952, to Potter; the scheme for local storage, recirculation, and comparison of a predetermined calling code with incoming signals as shown in U.S. Patent No. 2,973,507 issued February 28, 1961, to Grondin; relay arrangement shown in U.S. Patent No. 3,035,247 issued issued June 20, 1961, to Brosh; and the relay and matrix arrangement shown in U.S. Patent No. 3,035,247 isued May 15, 1962, to Sanford. Despite the variety of apparatus developed by the prior art a great deal of improvement is still needed for the purpose of reducing the volume and cost of circuit components, simplifying manufacturing procedures, and providing greater ease of changing the setting of the equipment from one predetermined value of the calling code to another.

One object of the invention, therefore, is to provide apparatus of the foregoing type in which the required number of memory elements and other associated circuit elements is substantially reduced.

Another object of the invention is to provide apparatus of the foregoing type which may be conveniently manufactured on a mass production basis, utilizing a very simple patch cord system for wiring in the circuit connections corresponding to a particular predetermined value of the calling code to which the particular receiver unit is intended to respond.

Yet a further object of the invention is to provide apparatus of the foregoing type utilizing a patch cord system in which the connections may be easily and quickly changed so as to change from one predetermined value of the calling code to another.

Still another object of the invention is to provide selective calling apparatus which, by virtue of its relatively small bulk and expense, is particularly well adapted for use in a personal paging system.

In accordance with the invention the calling code is received as a series of binary signals, but the decoding while performed mainly as a series operation also has an aspect of parallel operation. More specifically, the calling code is transmitted in Y successive subseries each having a length of X bits. A decoding tree of X-bit capacity is utilized to decode each subseries as it is received, and the outputs of the decoding tree are fed to a "sequential-and" register having Y stages corresponding to respective subseries of the calling code.

The objects and advantages of the invention will be more readily understood from the following description considered in conjunction with the accompanying drawing, in which.

Figures 1, 2:
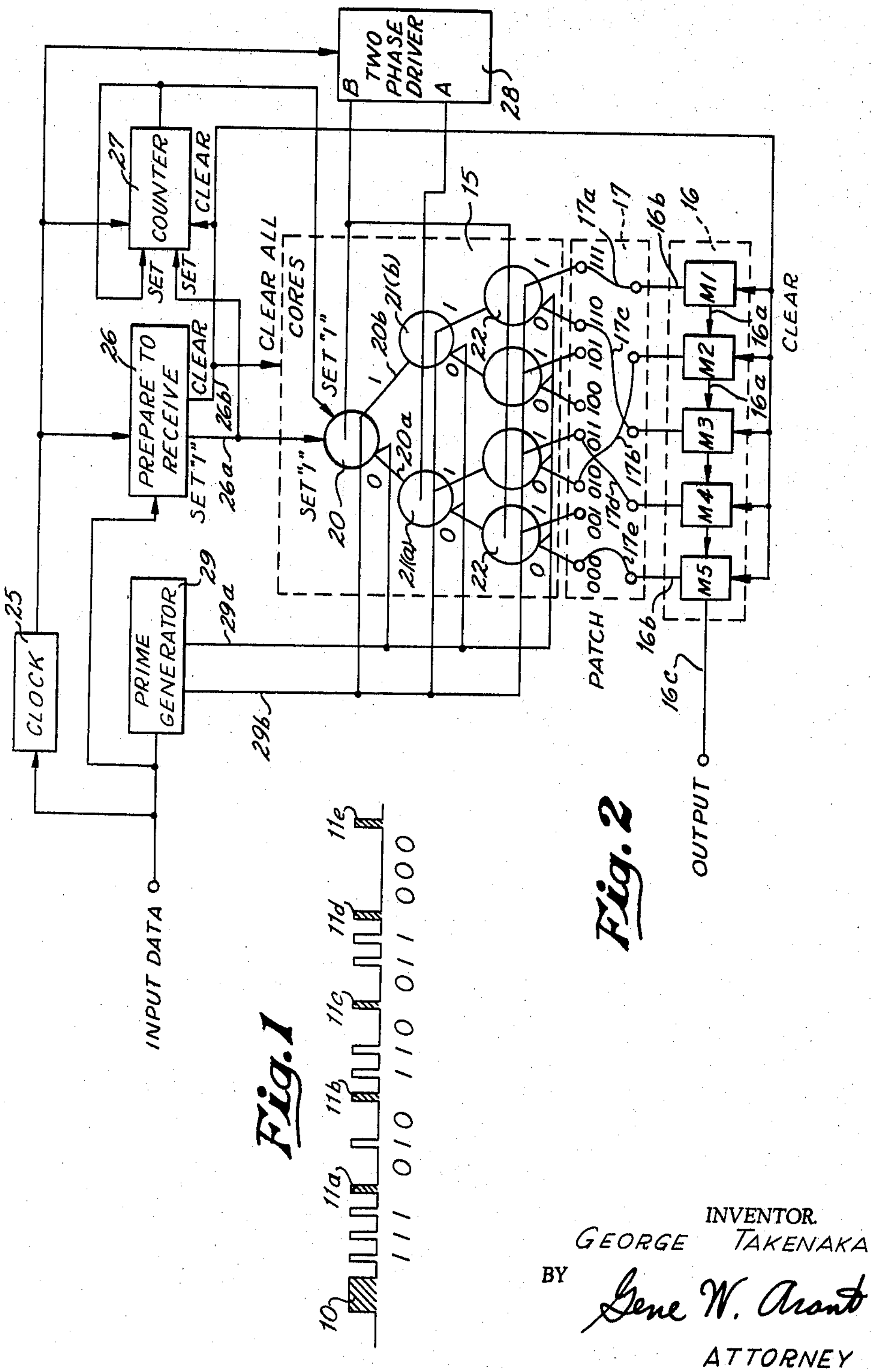
FIGURE 1 illustrates a typical calling code.
FIGURE 2 is a schematic diagram of the presently preferred form of the invention.

Reference is now made to FIGURE 1 illustrating a representative wave form of the calling code. In the particular example the calling code has a length of 15 bits, and consists of five subseries each having a length of three bits. A synchronizing pulse 10 has considerable length and denotes the commencement of the calling code. A plurality of equally spaced subseries marker pulses 11*a*, 11*b*, 11*c*, 11*d*, 11*e* follow the main synchronizing pulse 10 and are also used for purpose of synchronizing the operation of the receiving equipment. As shown in the particular example of FIGURE 1 the space immediately following synchronizing pulse 10 is occupied by three message pulses, which represent a binary value for the first subseries of 111. Marker pulse 11*a* is followed by a space, a message pulse, and another space, representing a binary value 010 for the second subseries. In similar manner the third subseries has the value 110; the fourth subseries the value 011; and the fifth subseries the value 000.

Referring now to FIGURE 2, the principal logical circuit elements of the illustrated apparatus include a decoding tree 15, a "sequential-and" register 16, and a set of patch cords 17. The decoding tree 15 includes an apex memory element 20; a pair of second-level memory elements 21; and four third-level memory elements 22. It will be noted that the three levels of memory elements in the decoding tree correspond to the three-bit length of each subseries of the calling code. As each subseries of the calling code is applied to the apex memory element 20, the operation of the decoding tree is such that upon completion of the reception of the particular subseries there is a particular one, and only one, output circuit associated with the third-level memory elements which becomes energized. Thus it may be said that the decoding tree accepts information in series, and has a plurality of output circuits which are essentially in parallel, only one of which becomes energized in response to the reception of a particular information series.

The "sequential-and" register 16 includes memory stages M1, M2, M3, M4, and M5. It will be noted that the number of memory stages corresponds to the number of subseries in the calling code illustrated in the example. The stage M2 and each succeeding stage has a control input 16*a*, and each of the stages including M1 has a signal input 16*b*. Energization of the signal input of stage M1 is operative to inject a signal into the stage M1. Thereafter the presence of a signal in stage M1 serves to energize the control input for stage M2, and upon concurrent energization of the signal input of stage M2 a signal becomes entered into that stage. In other words, entry of a signal into the first stage requires only the energization of its signal input, but entry of a signal into the second and each succeeding stage requires the concurrent energization of its signal input, and also of its control input that is responsive to the signal, if any, stored in the preceding stage.

The patch cords 17 include a plurality of separate patch cords, one coupled to the signal input of each stage of the "sequential-and" register. Each of the patch cords is in turn coupled to a selected one of the outputs of the decoding tree 15. Thus the patch cord 17*a* corresponding to the first subseries of the calling code is coupled between output circuit 111 of the decoding tree, and the signal input of register stage M1. Patch cord 17*b* is representative of the second subseries of the calling code, and is connected between the signal input of stage M2 and the output circuit 010 on the decoding tree. Patch cord 17*c* representing the third subseries of the calling code is coupled between the signal input of stage M3 and output circuit 110 of the decoding tree. Patch cord 17*d* representing the fourth subseries of the calling code is coupled between the signal input of stage M4 and the output circuit 011 of the decoding tree; and patch cord 17*e* representing the fifth subseries is connected between the signal input of stage M5 and output circuit 000 of the decoding tree. It will thus be seen that in order to produce an output signal on the final output 16*c* of register stage M5, it is necessary for each of the patch cords 17*a*, 17*b*, 17*c*, 17*d*, and 17*e* to be energized in sequence, in response to reception of the respectively associated subseries of the predetermined calling code.

It will be recognized that in accordance with the invention it is essential to have one patch cord coupled to the signal input of each register stage; but two or more of the patch cords could be connected to the same output circuit of the decoding tree. For example, if the predetermined calling code were a continuous series of binary 1's, then all of the patch cords would be connected to the output circuit 111 of the decoding tree, and each patch cord would also be connected to the signal input of its respective register stage.

The decoding tree 15 in the particular example shown has a capacity of $X=3$ bits and has $2^x=8$ output circuits. It will be recognized that while $2^x$ is the maximum number of usable output circuits that could be associated with the decoding tree, nevertheless in a particular situation, as for example when binary coded decimal numbers are being received, it might not be necessary to utilize that full number of output circuits.

The general arrangement and operation of the decoding tree 15 is entirely conventional. It is constructed utilizing magnetic cores for the memory elements, and more specifically, magnetic cores of the multiple-aperture type. Decoding trees constructed in this manner are presently manufactured and sold by AMP, Inc.

A "sequential-and" circuit such as 16 is well known in the art and may be constructed using magnetic cores as the memory elements, or any of various types of bistable circuits, or other equivalent devices. In the illustrated example it is assumed that magnetic cores are used in the register 16, to be in conformity with the type of structural elements used in the decoding tree.

Clock pulse generator 25 responds to the synchronizing signal 10 to synchronize its timing operation. A "prepare to receive" circuit 26 responds to the synchronizing signal 10 to generate a CLEAR signal for setting all of the cores of the decoding tree and the register to 0, thus preparing them to respond to the new calling code. Circuit 26 also sets a "1" signal into the apex memory element 20, which is then propagated to a particular one of the output circuits of the decoding tree in response to the first received subseries. A subseries counter 27 is utilized for setting a signal into the apex memory element 20 at the commencement of the second and each succeeding subseries of the calling code. Circuit 26 also controls the subseries counter in order to initiate its counting cycle at the proper point. Each subseries marker pulse occupies one clock period, hence counter 27 has a counting cycle of four clock periods. A two-phase driver 28 is utilized in conjunction with the decoding tree, to advance the stored signal "1" from the first level to the second level, and then from the second level to the third level.

The decoding tree 15 utilizes magnetic cores which as ferrite devices have two stable magnetic states, and each core contains two or more "minor apertures" through which certain windings may be threaded and from which outputs may be taken containing sufficient energy to "set" another such core through the "major aperture." An output pulse from a particular minor aperture is obtained only when the following three conditions are all satisfied in exactly the order listed:

(I) The core has been "set," or caused to be magnetized, around the inner magnetic path, in a direction opposite to the (arbitrarily assumed) "clear" or "0" direction;

(II) The core has been "primed," or the magnetic flux around the particular minor aperture from which output is to be taken is reversed from the direction existing after setting but prior to priming; and (III) The core is "cleared" or returned to the "0" state in both inner and outer flux paths by a high-amplitude "drive" pulse.

The three conditions are, briefly stated, I, *set*; II, *prime*; III, *drive*. If any one of these conditions is absent or if the sequence of their occurrence is incorrect, no output will be obtained from an output winding around the minor aperture.

In FIG. 2, the driver 28 is a two-phase driver which produces drive pulses of the proper amplitude and waveshape for clearing the cores, on two output lines A and B, respectively. The drive current alternates between A and B, according to the timing furnished by the clock 25, which as previously mentioned is synchronized to the input data bit rate. Thus when a drive pulse is produced on line A from driver 28, cores 21 are cleared, or restored to their "0" state, and when a drive pulse is produced on line B from driver 28, cores 20 and 22 of the subseries decoder 15 are cleared.

Prime generator 29 receives the input data and the clock signal, and produces an output on either of two lines 29*a* and 29*b*. Line 29*a* is energized when a particular input data bit is a "0" and 29*b* is energized when a particular input data bit is a "1." Prime generator 29 is a conventional design which is well known in the art. When line 29*a* is energized, this line couples through all of the "0" minor apertures of the cores 20 through 22, inclusive, and primes these minor apertures corresponding to condition II in the second preceding paragraph, supra. When line 29*b* is energized, all of the "1" minor apertures of cores 20 through 22, inclusive, are primed.

The "prepare to receive" or "set and clear" circuit 26 is of conventional design well known in the art, and responds to synchronization signal 10 serving to identify, in the input data, the beginning of a pulse group corresponding to the digital word to be transmitted. The synchronization signal may, for example, be a particular combination of pulses which is prevented from ever appearing in the data and which is therefore unique. The set and clear circuit 26 is assumed to be so configured that it will respond only to the synchronization signal, and will at that instant produce an output on each of lines 26*a* and 26*b*. The output on line 26*a* sets a "1" into apex core 20 of subseries decoder 15 and also sets a "1" into the first stage of counter 27. The output on line 26*b* clears all cores of subseries decoder 15 except core 20, clears all stages of counter 27 except the first, and clears all stages of register 16. These events all take place simultaneously when the synchronizing signal or pulse has been recognized.

The decoder is now ready for operation. The "1" set into core 20 of subseries decoder 15 progresses through the decoding tree on a path determined by the input data. After the initial "1" is set into core 20 as described above, either line 29*a* or line 29*b* becomes energized, according to whether the first bit in the frame is a "0" or a "1," respectively, and one of two minor apertures of core 20 becomes primed. Following this, an output from driver 28 is produced on line B, that clears core 20. Thus conditions I, II, and III (set, prime, drive) have all been met, so an output is produced from core 20 on either line 20*a* or line 20*b*, depending on whether the first data bit was a "0" or "1," respectively. If line 20*a* is energized by this output, then core 21*a* in subseries decoder 15 is caused to be set; if line 20*b* is energized, core 21*b* becomes set. The "1" originally set into core 20 has thus been caused to progress one step downward in the decoding tree.

On the second bit of the word, a similar action takes place. Either the "1" or the "0" minor apertures of both cores 21 are now primed, and line A is subsequently energized by two-phase driver 28, clearing (III) whichever core 21 has been (I) set and (II) primed. A similar action takes place at the third bit and, if more than a 3-bit subseries decoder had been assumed, would continue for succeeding bits, depending on the length of the decoder.

At the end of the third bit, and upon the second energization of line B of two-phase driver 28, a pulse output will be produced from subseries decoder 15 at one of eight terminals or output circuits representing the minor aperture outputs of cores 22. Connections are made from these output circuits through the patch cords 17 to signal inputs of register 16, as previously described.

While the decoding of the first subseries has been taking place, the "1" initially set into counter 27 has simultaneously progressed to the output line from this counter. Counter 27 produces an output timed to occur after an output from subseries decoder 15 has been transferred into register 16, but prior to the next data bit following this time. The output from counter 27 is now used to set a new "1" into core 20, and again into the first stage of counter 27, and the status of subseries decoder 15 and counter 27 is now exactly the same as it was when operation was first commenced at the time set and clear circuit 26 produced the initial "1" at the start of the frame.

It is thus apparent that the next subseries of data bits is decoded by subseries decoder 15 in exactly the same manner as that just described, and, in the illustration given, another output will be produced at the patch panel 17 when the next three bits has been decoded. This second output is presumed, in the example, to be the number 010, which is patched to memory element M2 in register 16. This output will cause memory element M2 to be set to its "1" state provided that memory element M1 has been previously set, all as previously explained.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. Apparatus responding uniquely to one predetermined combination of digits in a digital code sequence of predetermined length, comprising:
- a decoding tree;
- means for applying to said decoding tree a digital code sequence which includes a plurality of successive binary subseries of equal length, said decoding tree having several output circuits and being responsive to each received subseries in accordance with the value thereof to energize a selected one of said output circuits;
- a "sequential-and" circuit having a plurality of stages corresponding to respective subseries of said calling code;
- and means coupling each stage of said "sequential-and" circuit to an individual one of said output circuits to be driven thereby so that an output signal from the last stage of said "sequential-and" circuit is produced only in response to one predetermined value of said digital code sequence.

2. Apparatus as claimed in claim 1 wherein said coupling means includes a plurality of patch cords.

3. Selective calling apparatus for responding to a predetermined value of a serial binary code containing Y subseries each X bits in length, comprising, in combination:
- a subseries decoder of X-bit capacity having not more than $2^X$ output circuits each of which is energized in response to only one particular value of a received subseries;
- a "sequential-and" register having Y stages;
- means coupled to the particular one of said output circuits which corresponds to the first subseries of the predetermined-value code and responsive to the energization thereof for entering a signal into the first stage of said register;
- means intercoupling the second and each succeeding stage of said register with an individual one of said output circuits which corresponds to the respective subseries of the predetermined-value code, and responsive to the energization thereof for transferring the signal stored in said first stage to said second and succeeding stages of said register;
- and output means coupled to the last stage of said register for producing an output signal after reception of the predetermined-value code has been completed.

4. Apparatus as claimed in claim 3 wherein said coupling and intercoupling means include a plurality of patch cords.

5. Selective calling apparatus adapted to respond to a predetermined value of a serially presented identification code containing Y subseries each X bits in length, said apparatus comprising, in combination:
- a subseries decoding tree having not more than $2^X$ output circuits, and responsive at the conclusion of each received subseries to produce an output signal on the particular output circuit corresponding to the value of said received subseries;
- a "sequential-and" register including Y stages respectively corresponding to the successive subseries of the code;
- means coupling each of said register stages to the particular output circuit of said decoding tree which corresponds to the predetermined value of the associated subseries of the code;
- and output circuit means associated with the last stage of said register for producing a final output signal after reception of the identification code having said predetermined value has been completed.

6. Selective calling apparatus adapted to respond to a predetermined value of a serially presented identification code which contains a synchronizing signal followed by Y successive subseries of binary signals each X bits in length, said apparatus comprising, in combination:
- a clock pulse generator adapted to be synchronized by said synchronizing signal;
- a decoding tree having X levels of memory stages, including an apex memory stage as the first level thereof;
- a "prepare to receive" circuit responsive to said synchronizing signal for setting a signal into said apex memory stage;
- a two-phase driver associated with said decoding tree for advancing the stored signal from said apex memory stage through successive levels of said decoding tree, said decoding tree having not more than $2^X$ output circuits associated with the last level of memory stages thereof, and being responsive at the conclusion of a received subseries to produce an output signal on the particular one of said output circuits which corresponds to the value of the received subseries;
- a subseries counter adapted to be synchronized by said synchronizing signal, and operable for inserting a signal into said apex memory stage of said decoding tree prior to the commencement of the second and each succeeding received subseries;
- a "sequential-and" register including Y stages respectively corresponding to the successive subseries of the identification code, each of said Y stages having a signal input, and the second and each succeeding stage having a control input coupled to the immediately preceding stage;
- a patch cord coupling the signal input of the first of said Y stages to the particular output circuit of said decoding tree which corresponds to the predetermned value of the first subseries;
- a plurality of additional patch cords, each coupling the signal input of a respective one of the second and succeeding stages of said register with the particular one of said decoding tree output circuits which corresponds to the predetermined value of the associated subseries; and
- output means coupled to the last stage of said register for producing an output signal upon completion of the reception of the identification code having said predetermined value.

7. Apparatus as claimed in claim 1 which further includes synchronizing means for initiating the operation of said "sequential and" circuit at the beginning of said digital code sequence, and for initiating the operation of said decoding tree at the beginning of each of said binary subseries.

8. Apparatus as claimed in claim 1 wherein said "sequential and" circuit includes a separate "and" gate associated with the second and each succeeding stage thereof, and responsive to the set condition of the prior stage and the energization of one of said output circuits of said decoding tree for driving the associated stage to its set condition.

References Cited by the Examiner

UNITED STATES PATENTS

| | | | |
|---|---|---|---|
| 2,436,809 | 3/1948 | Joel | 340—164 |
| 2,498,695 | 2/1950 | McWhirter et al. | 340—164 |
| 3,056,116 | 9/1962 | Crane. | |
| 3,081,453 | 3/1963 | Nitzan | 340—347 |

NEIL C. READ, *Primary Examiner.*

H. PITTS, *Assistant Examiner.*